UNITED STATES PATENT OFFICE.

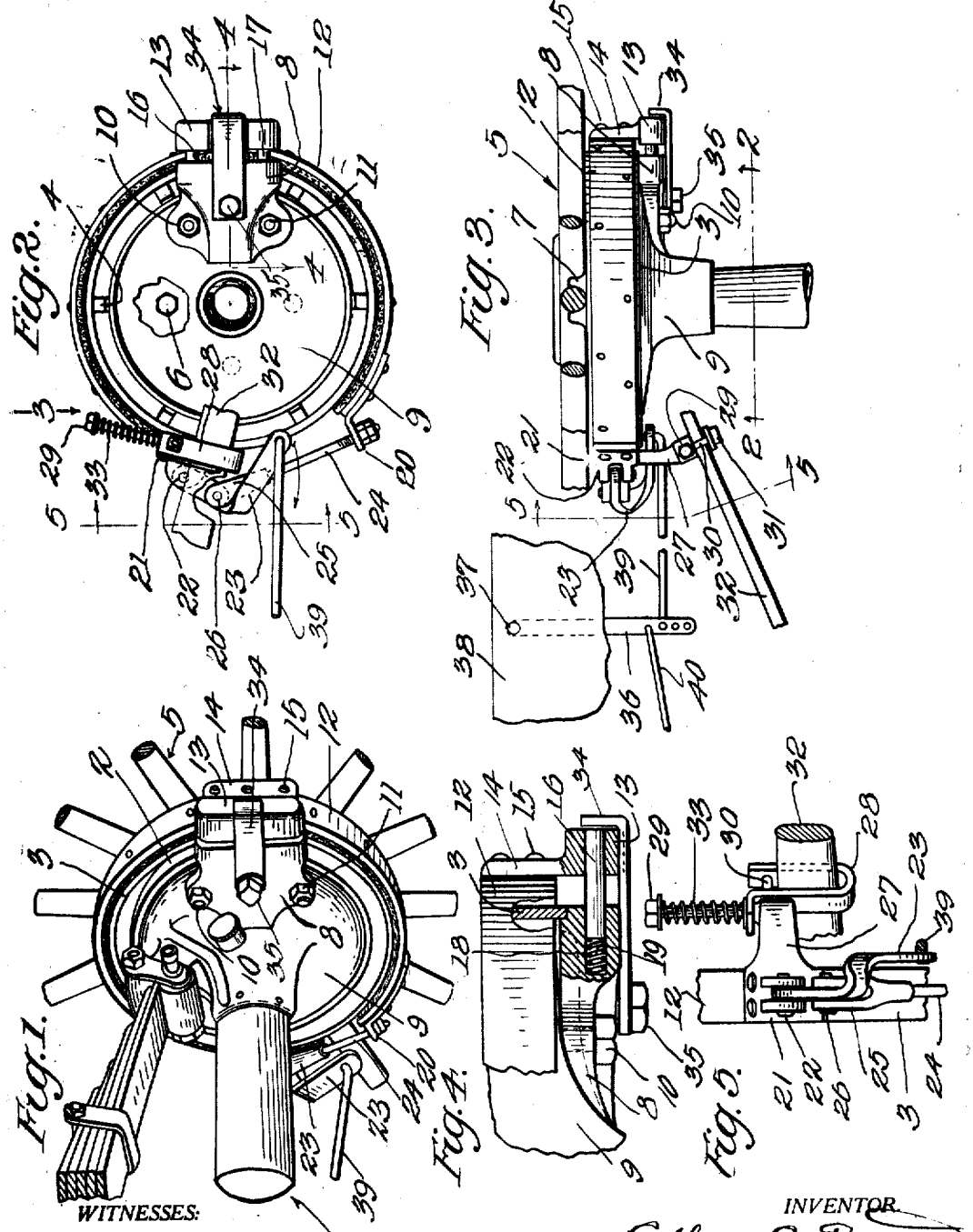
C. C. EVANS.
BAND BRAKE.
APPLICATION FILED APR. 3, 1916.
1,208,937.
Patented Dec. 19, 1916.

CULLEN C. EVANS, OF LOS ANGELES, CALIFORNIA.

BAND-BRAKE.

1,208,937.

Specification of Letters Patent. Patented Dec. 19, 1916.

Application filed April 3, 1916. Serial No. 88,641.

*To all whom it may concern:*

Be it known that I, CULLEN C. EVANS, a citizen of the United States, residing at Los Angeles, in the county of Los Angeles and State of California, have invented new and useful Improvements in Band-Brakes, of which the following is a specification.

This invention relates to an automobile brake band and is especially designed for Ford cars, although it may be applied to other cars without departing from the principles of this invention.

The ordinary band brake as applied to the rear wheels of an automobile generally drags on the brake drum and causes friction and attendant loss of power.

One of the objects of this invention is to provide a brake which may be applied to the Ford rear axle without changing the construction in any way and which when applied will provide a larger braking surface and more positive action, and when the brake is released the band is expanded by spring operated means to entirely release said band from the drum to allow said drum to run free.

Another object is to connect the brake band with the brake pedal through a cord, lever and link connection, in such a manner that the brake band lever is pulled in a straight line and not at an angle.

Referring to the drawings: Figure 1 is a rear perspective of one of the rear wheels and rear axle construction, showing the brake and connections in place. Fig. 2 is a sectional elevation of one of the brake drums and brake mechanism and taken upon the line 2—2 of Fig. 3. Fig. 3 is a fragmentary plan view as seen looking in the direction of arrow 3 in Fig. 2. Fig. 4 is an enlarged fragmentary sectional detail taken upon the line 4—4 of Fig. 2. Fig. 5 is an enlarged sectional front elevation taken upon the lines 5—5 of Figs. 2 and 3.

Referring more particularly to the drawings, 1 designates the rear axle housing of a Ford car provided with the ordinary brake drum 2. One size of brake band provided with this invention is constructed to fit the ordinary drum 2, but I prefer to construct a larger drum 3 provided with internal tapered lugs 4 into which the drum 2 is wedged and bolted to the wheel 5 by the bolts 6, the lugs 7 on the back side of said drum 3 embracing the spokes of the wheel, thereby bracing said wheel and holding the drum rigidly in place. The drum 3 provides a much greater braking surface than the ordinary drum 2 and for this reason I prefer the construction shown in the drawings.

A member 8 is bolted to the portion 9 of the rear housing 1, by bolts 10 and 11. The brake band 12 is a circular spring band and is provided with a casting 13, said casting having a projection 14 which is bolted to the band 12 by bolts 15. Lugs 16 and 17 are inserted into the casting 13 and project therefrom and enter openings 18 drilled into the member 8. Small coil springs 19 constructed of piano wire are inserted in the openings 18 and the pins 16 and 17 of the member 13 bear against these springs, thereby holding the rear of the brake band away from the brake drum 3 as shown in Fig. 2.

The brake band 12 is open on the front side as is usual in this class of brakes, and a bracket 20 is riveted to one end of said band. A bracket 21 is riveted to the upper end of said band and is provided with ears through which the pin 22 is inserted. The bell crank brake lever 23 is hingedly held in place by the pin 22. A bolt 24 extends through the bracket 20 and jam nuts are screwed upon the lower end thereof outside of said bracket to adjust the same. The upper end of bolt 24 is provided with a furcated member 25 which is secured to lever 23 by the pin 26. An arm 27 is formed with the bracket 21 and extends inwardly and a U-shaped clip 28 is held on the outer end of the arm by the bolt 29 tapped into the upper face of said arm. The clamping bolt 30 extends through the upper ends of the clip 28 and the nut 31 is screwed upon the outer end thereof, so that said clip may be clamped to the radius rod 32 to hold the brake band in position. A compression spring 33 surrounds the bolt 29 and rests upon the upper end of the clip 28.

When the brake is set the arm 27 moves downwardly a slight distance and carries the bolt 29 with it thereby compressing spring 33, and upon releasing the brake lever said arm 27 is drawn upwardly by the action of spring 33 which releases the brake band 12 from frictional contact with the brake drum 3 and allows said drum to run free.

A stop member 34 is bolted to the member 8 by a bolt 35 to limit the outward movement of the casting 13.

A lever 36 is pivotally connected by the bolt 37 to the underside of the running board 38. A link 39 connects the lever 36 with the lever 23, and a connection 40 connects the lever 36 with the foot pedal of the machine. The lever 36 transmits a straight pull to the lever 23 and obviates the angular pull occasioned by connecting direct from the foot pedal.

It is obvious that I have constructed a brake which will not drag on the drum and will be more positive in action thereby decreasing friction and increasing power transmitted to the rear wheels.

I claim:

1. In a brake for an automobile, the combination of a brake drum, a brake band thereon, a band spacing mechanism comprising a support having a plurality of parallel sockets, a band holding member provided with a plurality of pins slidably mounted in said sockets, springs in said sockets engaging said pins and tending to move said band away from the periphery of said drum, and a stop to limit the outward movement of said band.

2. In a brake for automobiles, the combination of a brake drum, a brake band thereon, a spacing mechanism comprising a support having a socket, a band holding member provided with a pin slidably mounted in said socket, resilient means in said socket tending to move said band holding member away from the periphery of said drum and a stop to limit the outward movement of said band holding member.

In testimony whereof I have signed my name to this specification.

CULLEN C. EVANS.